(12) United States Patent
Liu et al.

(10) Patent No.: US 11,746,491 B2
(45) Date of Patent: Sep. 5, 2023

(54) CONSTRUCTION PROCESS OF SOIL NAILING WALL FOR GEOLOGICAL DISASTER CONTROL

(71) Applicant: Qingdao Geo-Engineering Survering Institute (Qingdao Geological Exploration Development Bureau), Qingdao (CN)

(72) Inventors: Honghua Liu, Qingdao (CN); Lei Cao, Qingdao (CN); Zhongsheng Wang, Qingdao (CN); Jie Dong, Qingdao (CN); Peng Yu, Qingdao (CN); Wanlong Qu, Qingdao (CN); Shian Liu, Qingdao (CN); Zhaojie Gu, Qingdao (CN); Jiani Fu, Qingdao (CN)

(73) Assignee: Qingdao Geo-Engineering Survering Institute (Qingdao Geological Exploration Development Bureau), Qingdao (CN)

( * ) Notice: Subject to any disclaimer, the term of this patent is extended or adjusted under 35 U.S.C. 154(b) by 0 days.

(21) Appl. No.: 17/987,786

(22) Filed: Nov. 15, 2022

(65) Prior Publication Data
US 2023/0151578 A1    May 18, 2023

(30) Foreign Application Priority Data

Nov. 16, 2021   (CN) .......................... 202111352411.3

(51) Int. Cl.
*E02D 17/20*   (2006.01)
*E02D 3/08*    (2006.01)
*E02D 7/00*    (2006.01)

(52) U.S. Cl.
CPC .................................. *E02D 17/20* (2013.01)

(58) Field of Classification Search
CPC ............................... E02D 17/20; E02D 15/08
See application file for complete search history.

(56) References Cited

FOREIGN PATENT DOCUMENTS

| CN | 103485349 A | | 1/2014 | | |
|----|-------------|---|---------|---|---|
| CN | 107938679 A | | 4/2018 | | |
| CN | 108612114 A | * | 10/2018 | ........... | E02D 17/207 |
| CN | 208152613 U | | 11/2018 | | |
| CN | 109653220 A | | 4/2019 | | |
| CN | 211948441 U | * | 11/2020 | | |
| CN | 212078035 U | | 12/2020 | | |
| CN | 113565100 A | | 10/2021 | | |
| CN | 114263183 A | * | 4/2022 | | |
| GB | 2243391 A | * | 10/1991 | ............. | E02D 17/20 |

* cited by examiner

*Primary Examiner* — Benjamin F Fiorello
*Assistant Examiner* — Stacy N Lawson

(57) ABSTRACT

A construction process of soil nailing wall for geological disaster control is provided, which uses a construction equipment of soil nailing wall for geological disaster control, including underframe, lifting assembly and etc.; a lifting assembly is installed on the left side of the upper side of the underframe. When in use, the disclosure can automatically cut off the tree trunks extending out of the slope surface, and then install the grouting rods in the soil slope holes. At the same time, the disclosure can adapt to the tree trunks with different bending degrees to cut them, which solves the problem of tree trunks interfering with the construction, greatly improves the efficiency, prevents the cut tree trunks from falling onto the slope, avoids damaging the slope surface, and can adapt to a variety of situations to cut off the tree trunks.

8 Claims, 11 Drawing Sheets

CONSTRUCTION PROCESS OF SOIL NAILING WALL FOR GEOLOGICAL DISASTER CONTROL

CROSS-REFERENCE TO RELATED APPLICATIONS

This application claims priority to Chinese Application No. 202111352411.3, filed on Nov. 16, 2021, entitled A Photoanode Film for the Photocathode Protection and the Durability Improvement of a Reinforcing Bar in Concretes, the Preparation Method thereof and A Method of Using the Photoanode Film for the Photocathode Protection and the Durability Improvement of a Reinforcing Bar in Concretes. These contents are hereby incorporated by reference.

TECHNICAL FIELD

The disclosure relates to the field of geological disaster control, in particular to a construction process of soil nailing wall for geological disaster control.

BACKGROUND

Soil nailing wall is a kind of in-situ soil reinforcement technique. The foundation pit slope is reinforced by soil nails made of steel bars. A reinforcement mesh is laid on the slope surface, and then a concrete surface layer is sprayed on the slope to reinforce the slope. It is a slope reinforcement type support construction method. Its structure is a composite formed by firmly bonding the reinforcement bars (i.e. soil nails or anchor bolts) set in the slope with the surrounding soil, and the supporting structure formed by the surface course similar to the gravity retaining wall.

In the existing technology, one kind of soil slope near the winding mountain road is prone to landslide, and the debris flows onto the road surface seriously affecting the traffic. When the existing device reinforces such soil slope, it directly inserts the grouting rod into the preset hole in the soil slope, which has a single function. However, after the occurrence of a slight landslide, small trees are buried in the soil slope, making some of the tree trunks extend out of the slope, and the extended tree trunks will interfere with the operation of the existing device, and seriously affects the process of installing soil nails and greatly reduces the efficiency.

Therefore, it is necessary to develop a construction process of soil nailing wall for geological disaster control.

SUMMARY

In order to overcome the disadvantage that after a slight landslide, small trees are buried in the soil slope, so that some of the tree trunks extend out of the slope surface, and the extended tree trunks will interfere with the operation of existing devices, greatly reducing the efficiency, the disclosure provides a soil nailing wall construction process for geological disaster control.

Technical solution: A construction process of soil nailing wall for geological disaster control, which adopts a construction equipment of soil nailing wall for geological disaster control, including an underframe, a handrail and wheels, a first telescopic cylinder and a support block, a lifting assembly, a fixing assembly, a cutting assembly, a tilting assembly, a clamping assembly and a reinforcement assembly; an upper right part of the underframe is fixedly connected with the handrail; four wheels are fixedly connected to a lower side of the underframe; four first telescopic cylinders are fixedly connected on an outer edge of an upper side of the underframe; lower telescopic ends of the four first telescopic cylinders are fixedly connected with a support block respectively; a left part of the upper side of the underframe is provided with the lifting assembly; the fixing assembly is arranged at a front of an upper side of the lifting assembly; the cutting assembly is arranged at a middle of the fixing assembly; the tilting assembly is arranged at a rear of the upper side of the lifting assembly; a lower part of the tilting assembly is provided with the clamping assembly; two reinforcement assemblies are arranged at a left part and a right part of a front side of the tilting assembly respectively; another two reinforcement assemblies are arranged at a left part and a right part of a rear side of the tilting assembly respectively; each of the four reinforcement assemblies is connected with the clamping assembly.

The construction process of soil nailing wall for geological disaster control includes the following steps:

S1: lifting, driving the fixed assembly and the cutting assembly to move to a side of the tree trunk protruding from the soil slope by the lifting assembly;

S2: clamping, clamping a root of the tree trunk extending out of the soil slope and a side far from the root by the fixing assembly;

S3: cutting, cutting the tree trunk along a middle of two clamping positions by the cutting assembly;

S4: conveying, conveying the cut tree trunk to the ground by fixing assembly;

S5: loading, manually placing a grouting rod in the clamping assembly, and fixing the grouting rod by the clamping assembly;

S6: transferring, transferring the grouting rod to a side of a soil slope hole;

S7: tilting, lifting an end of the grouting rod away from the soil slope hole upward;

S8: filling, filling the grouting rod into the soil slope hole.

Compared with the prior art, the disclosure has the following advantages: when in use, it can automatically cut off the tree trunks extending out of the slope, and then install the grouting rod in the soil slope holes, at the same time, it can cut off the tree trunks with different bending degrees, solve the problem that the tree trunks interfere with the construction, greatly improve the efficiency. Besides, it can prevent the cut off tree trunks from falling onto the slope to avoid damaging the slope, the broken and sagging tree trunk can be lifted up and cut to adapt to various situations, and the sediment falling on the guide rail can be automatically cleaned up at the same time.

Figure 1:
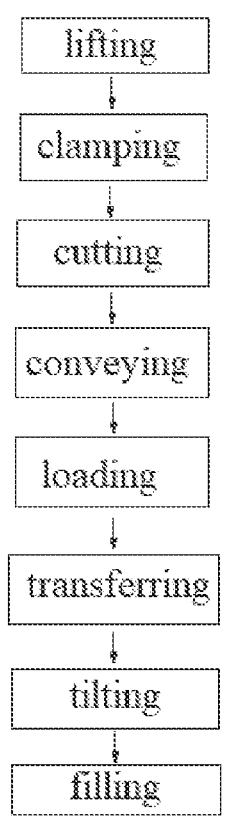
FIG. 1 is a flow chart of the construction process of the soil nailing wall for geological disaster control of the disclosure.

Number marks in the attached figures: 1—underframe, 2—handrails, 3—wheels, 4—first telescopic cylinder, 5—support block, 201—support frame, 202—first guide rail, 203—first electric slider, 204—first linkage frame, 205—second electric slider, 206—second linkage frame, 301—second guide rail, 302—third electric slider, 303—third linkage frame, 304—fourth linkage frame, 305—second telescopic cylinder, 306—first linkage block, 307—fifth linkage frame, 308—first manipulator, 309—second manipulator, 401—third guide rail, 402—fourth electric slider, 403—electric saw, 501—fourth guide rail, 502—fifth electric slider, 503—sixth linkage frame, 504—first reel wheel, 505—first rope, 506—second linkage block, 507—motor, 601—seventh linkage frame, 602—first clamp, 603—third telescopic cylinder, 604—second clamp, 605—roller, 701—limit block, 702—rack, 703—limit rod, 704—transmission rod, 705—straight gear, 706—second reel wheel, 707—second rope, 708—linkage ring, 801—electric rotation shaft, 802—third linkage block, 803—fifth guide rail, 804—sixth electric slider, 805—push frame, 806—brush.

DETAILED DESCRIPTION OF THE EMBODIMENTS

Now each Example in the present application is further described in combination with the drawings.

Embodiment 1

As shown in FIG. 1—FIG.9, a construction process of soil nailing wall for geological disaster control, which adopts a construction equipment of soil nailing wall for geological disaster control, including an underframe 1, a handrail 2 and wheels 3, a first telescopic cylinder 4 and a support block 5, the construction equipment further comprises a lifting assembly, a fixing assembly, a cutting assembly, a tilting assembly, a clamping assembly and a reinforcement assembly. The right part of the upper side of the underframe 1 is fixedly connected with the handrail 2, four wheels 3 are fixedly connected to the lower side of the underframe 1, four first telescopic cylinders 4 are fixedly connected on the outer edge of the upper side of the underframe 1, and the lower telescopic ends of the four first telescopic cylinders 4 are fixedly connected with the support block 5 respectively; the left part of the upper side of the underframe 1 is provided with the lifting assembly; the fixing assembly is arranged at the front of the upper side of the lifting assembly; the cutting assembly is arranged at the middle of the fixing assembly; the tilting assembly is arranged at the rear of the upper side of the lifting assembly; the lower part of the tilting assembly is provided with the clamping assembly; two reinforcement assemblies are arranged at the left part and the right part of the front side of the tilting assembly respectively; another two reinforcement assemblies are arranged at the left part and the right part of the rear side of the tilting assembly respectively; each of the four reinforcement assemblies is connected with the clamping assembly.

The construction process of soil nailing wall for geological disaster control includes the following steps:

S1: lifting, driving the fixed assembly and the cutting assembly to move to a side of the tree trunk extending out of the soil slope by the lifting assembly;

S2: clamping, clamping a root of the tree trunk extending out of the soil slope and a side far from the root by the fixing assembly;

S3: cutting, cutting the tree trunk along a middle of two clamping positions by the cutting assembly;

S4: conveying, conveying the cut tree trunk to the ground by fixing assembly;

S5: loading, manually placing a grouting rod in the clamping assembly, and fixing the grouting rod by the clamping assembly;

S6: transferring, transferring the grouting rod to a side of a soil slope hole;

S7: tilting, lifting an end of the grouting rod away from the soil slope hole upward;

S8: filling, filling the grouting rod into the soil slope hole.

The lifting assembly includes a support frame 201, a first guide rail 202, a first electric slider 203, a first linkage frame 204, a second electric slider 205 and a second linkage frame 206. Two support frames 201 are fixedly connected to the front part of the upper side and the rear part of the upper side of the underframe 1 respectively. The upper side of the underframe 1 is fixedly connected with the first guide rail 202, and the first guide rail 202 is located in the middle of the gap between the two support frames 201. The two support frames 201 are fixedly connected with the first guide rail 202, and the front part of the first guide rail 202 is slidably connected with the first electric slider 203. The front side of the first electric slider 203 is fixedly connected with the first linkage frame 204, and the rear part of the first guide rail 202 is slidably connected with the second electric slider 205. The rear side of the second electric slider 205 is fixedly connected with the second linkage frame 206. The lower side of the first linkage frame 204 is connected with the fixing assembly, and the lower side of the second linkage frame 206 is connected with the tilting assembly.

The fixing assembly includes a second guide rail 301, a third electric slider 302, a third linkage frame 303, a fourth linkage frame 304, a second telescopic cylinder 305, a first linkage block 306, a fifth linkage frame 307, a first manipulator 308 and a second manipulator 309. The lower side of the first linkage frame 204 is fixedly connected with the second guide rail 301. The second guide rail 301 is slidably connected with the third electric slider 302. The lower side of the third electric slider 302 is fixedly connected with the third linkage frame 303. The front side of the third linkage frame 303 is fixedly connected with the fourth linkage frame 304. The front side of the fourth linkage frame 304 is rotationally connected with the fifth linkage frame 307. The middle of the upper side of the fourth linkage frame 304 is rotationally connected with the second telescopic cylinder 305. The telescopic end of the second telescopic cylinder 305 is rotationally connected with the first linkage block 306. The first linkage block 306 is rotationally connected with the fifth linkage frame 307. The fifth linkage frame 307 is equipped with the first manipulator 308 on the left part of the front side through a torsion shaft. The fifth linkage frame 307 is equipped with the second manipulator 309 on the right part of the front side through the torsion shaft. The upper part of the front side of the fifth linkage frame 307 is connected with the cutting assembly.

The cutting assembly includes a third guide rail 401, a fourth electric slider 402 and an electric saw 403. The upper part of the front side of the fifth linkage frame 307 is fixedly connected with the third guide rail 401, the third guide rail 401 is slidably connected with the fourth electric slider 402, and the front side of the fourth electric slider 402 is provided with the electric saw 403.

The tilting assembly includes a fourth guide rail 501, a fifth electric slider 502, a sixth linkage frame 503, a first reel wheel 504, a first rope 505, a second linkage block 506 and a motor 507. The lower side of the second linkage frame 206 is fixedly connected with the fourth guide rail 501. The fourth guide rail 501 is slidably connected with the fifth electric slider 502. The lower side of the fifth electric slider 502 is fixedly connected with the sixth linkage frame 503. The left part and the right part of the sixth linkage frame 503 are rotationally connected with the first reel wheel 504 respectively. Two motors 507 are respectively arranged on the left part and the right part of the rear side of the sixth linkage frame 503, and the output ends of the two motors 507 are respectively fixedly connected with the two first reel wheels 504. The two first ropes 505 is wound on the two first reel wheels 504, and the lower ends of the two first ropes (505) are suspended and connected with the second linkage block 506 respectively. The two second linkage blocks 506 are connected with the clamping assembly respectively. The sixth linkage frame 503 is connected with four groups of the reinforcement assemblies.

The clamping assembly includes a seventh linkage frame 601, a first clamp 602, a third telescopic cylinder 603, a second clamp 604 and a roller 605. The lower parts of the two second linkage blocks 506 are rotationally connected with the seventh linkage frame 601 respectively. The left part and the right part of the seventh linkage frame 601 are fixedly connected with one first clamp 602 respectively, and the upper sides of the two first clamps 602 are fixedly connected with two third telescopic cylinders 603 respectively. One second clamp 604 is fixedly connected to the lower telescopic end of each corresponding two third telescopic cylinders 603. The inner sides of the two second clamps 604 are rotationally connected with a plurality of rollers 605. The second clamp 604 located on the left side is connected with two reinforcement assemblies located on the left side, and the second clamp 604 located on the right side is connected with two reinforcement assemblies located on the right side.

The middle of the first clamp 602 is provided with an upper semicircular groove.

The middle of the second clamp 604 is provided with a lower semicircular groove, and the middle of the semicircular groove is provided with a plurality of small grooves.

The reinforcement assemblies at the front left side includes a limit block 701, a rack 702, a limit rod 703, a transmission rod 704, a straight gear 705, a second reel wheel 706, a second rope 707 and a linkage ring 708. The front part of the left side of the sixth linkage frame 503 is fixedly connected with the limit block 701, the left part of the limit block 701 is slidably connected with the rack 702, the lower part of the rack 702 is fixedly connected with the limit rod 703, and the lower part of the limit rod 703 is inserted with the seventh linkage frame 601. The middle of the limit block 701 is rotationally connected with a transmission rod 704. The left part of the transmission rod 704 is fixedly connected with the straight gear 705, and the straight gear 705 engages with the rack 702. The right part of the transmission rod 704 is fixedly connected with the second reel wheel 706. The second reel wheel 706 is connected with the straight gear 701 through a torsion spring. The second reel wheel 706 is wound with the second rope 707, the front side of the second clamp 604 on the left is fixedly connected with the linkage ring 708, and the lower end of the second rope 707 is movably connected with the linkage ring 708.

During preparation, the construction equipment of soil nailing wall for geological disaster treatment is moved to the side of the soil slope to be treated, and make the front and rear directions of the device parallel to the slope surface, wherein the left side of the device is close to the slope surface. The external power supply is connected, and then the external controller is operated to control the device to start operation. Then, the first electric slider 203 slides down on the first guide rail 202, and the first electric slider 203 drives the first linkage frame 204 to move down, the first linkage frame 204 drives the fixing assembly and the cutting assembly to move downward, so that the first manipulator 308 and the second manipulator 309 are aligned with the height of the trunk extending out of the slope. Then the third electric slider 302 slides to the left on the second guide rail 301, the third electric slider 302 drives the third linkage frame 303 to move to the left, and the third linkage frame 303 drives its associated parts to move to the left, so that the first manipulator 308 moves to the root of the trunk extending out of the soil slope. The first manipulator 308 and the second manipulator 309 automatically open, and then push the device forward to make the tree trunk located in the calipers of the first manipulator 308 and the second manipulator 309. In addition, the second telescopic cylinder 305 performs telescopic movement to drive the first linkage block 306 to move, the first linkage block 306 drives the fifth linkage frame 307 to swing around the fourth linkage frame 304, and the fifth linkage frame 307 drives its associated parts to move, such that the calipers of the first manipulator 308 and the second manipulator 309 can contact the tree trunk from all angles, and then the four first telescopic cylinders 4 drive the four support blocks 5 to move downward, so that the four support blocks 5 contact the ground and support the underframe 1. And then, the first manipulator 308 and the second manipulator 309 clamp the tree trunk at the same time, because the tree trunk is not straight enough, the first manipulator 308 and the second manipulator 309 rotate a certain distance around the two torsion springs on the fifth linkage frame 307 and the electric saw 403 is started at this time. The fourth electric slider 402 moves downward on the third guide rail 401, the fourth electric slider 402 drives the electric saw 403 to move downward, so that the electric saw 403 cuts off the trunk protruding from the soil slope, and then the fourth electric slider 402 drives the electric saw 403 to move upward to return to the original position. After that, the first manipulator 308 opens automatically, then the third electric slider 302 drives the third linkage frame 303 to move to the right, so that the second manipulator 309 drives the severed tree trunk to move to the right. Then the second manipulator 309 stops fixing the cut tree trunk, the cut tree trunk falls naturally to the ground, and then the tree trunk is manually removed to prevent the cut tree trunk from falling directly onto the soil slope. Then the four first telescopic cylinders 4 drive the four support blocks 5 to move up and back to their original positions respectively, so as to make the four wheels 3 touch the ground again, and then manually push the device forward for a certain distance, so that the first clamp 602 is aligned with the horizontal direction of the hole on the soil slope. And then the four first telescopic cylinders 4 drive the four support blocks 5 to move downward to support the underframe 1, then the second electric slider 205 drives the second linkage frame 206 to move downward, and the second linkage frame 206 drives its associated parts to move downward, the first clamp 602 is aligned with the hole on the soil slope vertically, and then the grouting rod is manually placed in the middle of the two second clamps 604. At the same time, the grouting rod is manually fixed, and then the four third telescopic cylinders 603 simultaneously perform telescopic movement, so that the two second clamps 604 fasten the grouting rod on the two first clamps 602. At the same time, the second clamp 604 located on the left drives the linkage ring 708 to move upward, so as to stop stretching the second rope 707, then the torsion spring on the limit block 701 drives the second reel wheel 706 to rotate. The second reel wheel 706 drives the transmission rod 704 to rotate, the transmission rod 704 drives the straight gear 705 to rotate, the second reel wheel 706 reels the second rope 707. The straight gear 705 drives the rack 702 to move upward, the rack 702 drives the limit rod 703 to move upward, so that the limit rod 703 is separated from the seventh linkage frame 601 upward. Then the fifth electric slider 502 moves to the left on the fourth guide rail 501, the fifth electric slider 502 drives the sixth linkage frame 503 to move to the left, and the sixth linkage frame 503 drives its associated parts to move to the left, so that two first clamps 602 and two second clamps 604 simultaneously transport the grouting rod to the soil slope hole. Starting the motor 507 on the right, and the motor 507 on the right drives the first reel 504 on the right to rotate, the first reel wheel 504 on the right side reels the first rope 505 on the right side, so that the first rope 505 on the back pulls the second linkage block 506 to move upward, so that the second linkage block 506 pulls the right side of the seventh linkage frame 601 to move upward, the seventh linkage frame 601 drives its associated parts to move, so that the right end of the grouting rod is tilted upward, and then the four third telescopic cylinders 603 extend, so as to make the two second clamps 604 move downward to stop clamping the grouting rod. At the same time, the second clamp 604 drives the linkage ring 708 to move downward, the linkage ring 708 pulls the second rope 707 to move, so that the second rope 707 drives the second reel wheel 706 to rotate, the second reel wheel 706 drives the transmission rod 704 to rotate, the transmission rod 704 drives the straight gear 705 to rotate, so that the straight gear 705 drives the rack 702 to move downward, and the rack 702 drives the limit rod 703 to move downward, such that the lower part of the limit rod 703 is inserted into the seventh linkage frame 601 to prevent the swing of the seventh linkage frame 601. At this time, the grouting rod moves up and down on a plurality of rollers 605 under the action of gravity, so that the grouting rod slides into the hole in the soil slope. When in use, the tree truck extending out of the slope surface is automatically cut off, and then the grouting rod is installed in the hole in the soil slope. At the same time, the tree trunk with different bending degrees can be cut off, which solves the problem that the trunk interferes with the construction, greatly improves the efficiency, and prevents the cut trunk from falling onto the slope to avoid damaging the slope.

Embodiment 2

Figure 2:
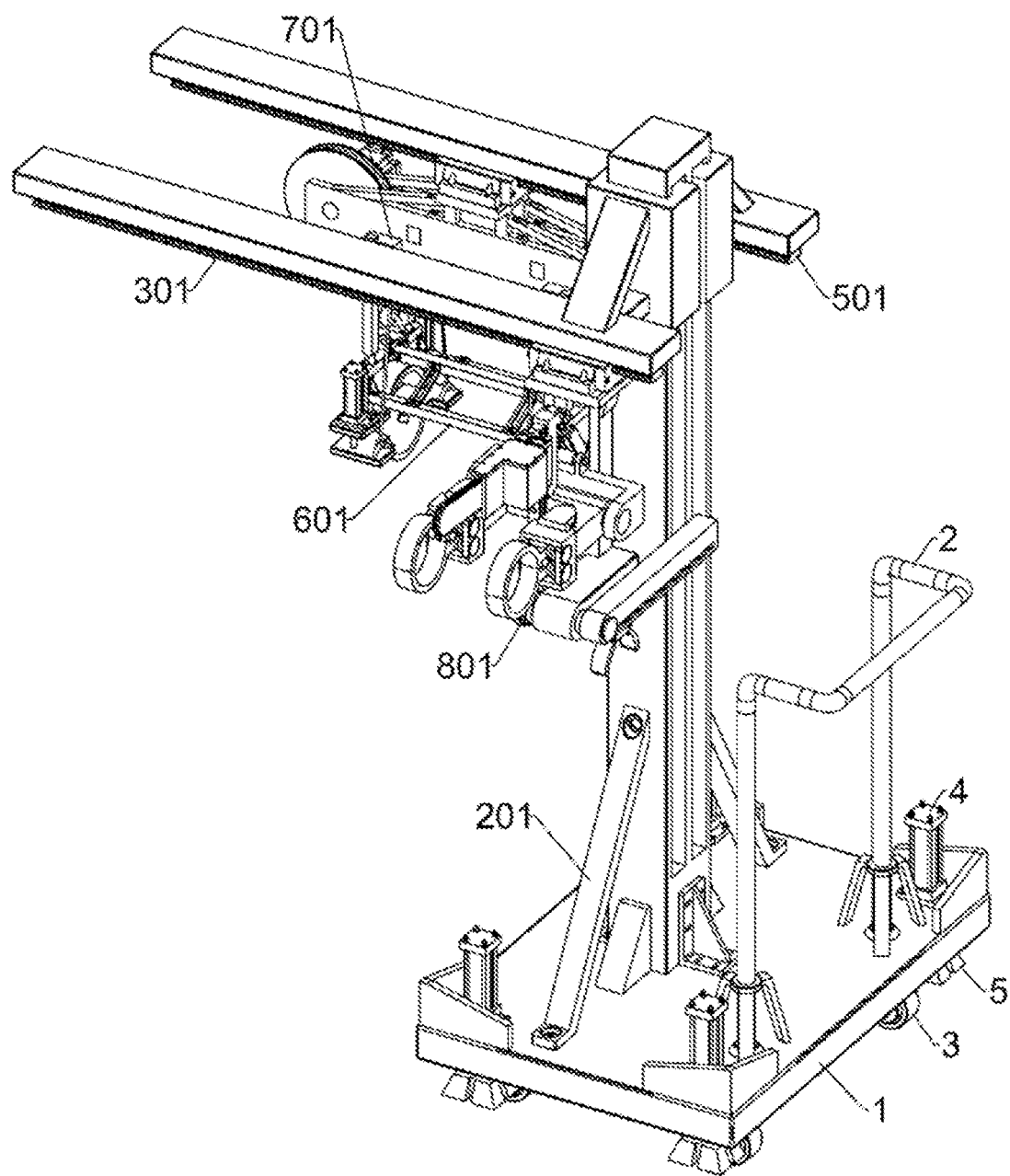
FIG. 2 is a structural diagram of the construction equipment of soil nailing wall for geological disaster control according to the disclosure.
Figure 3:
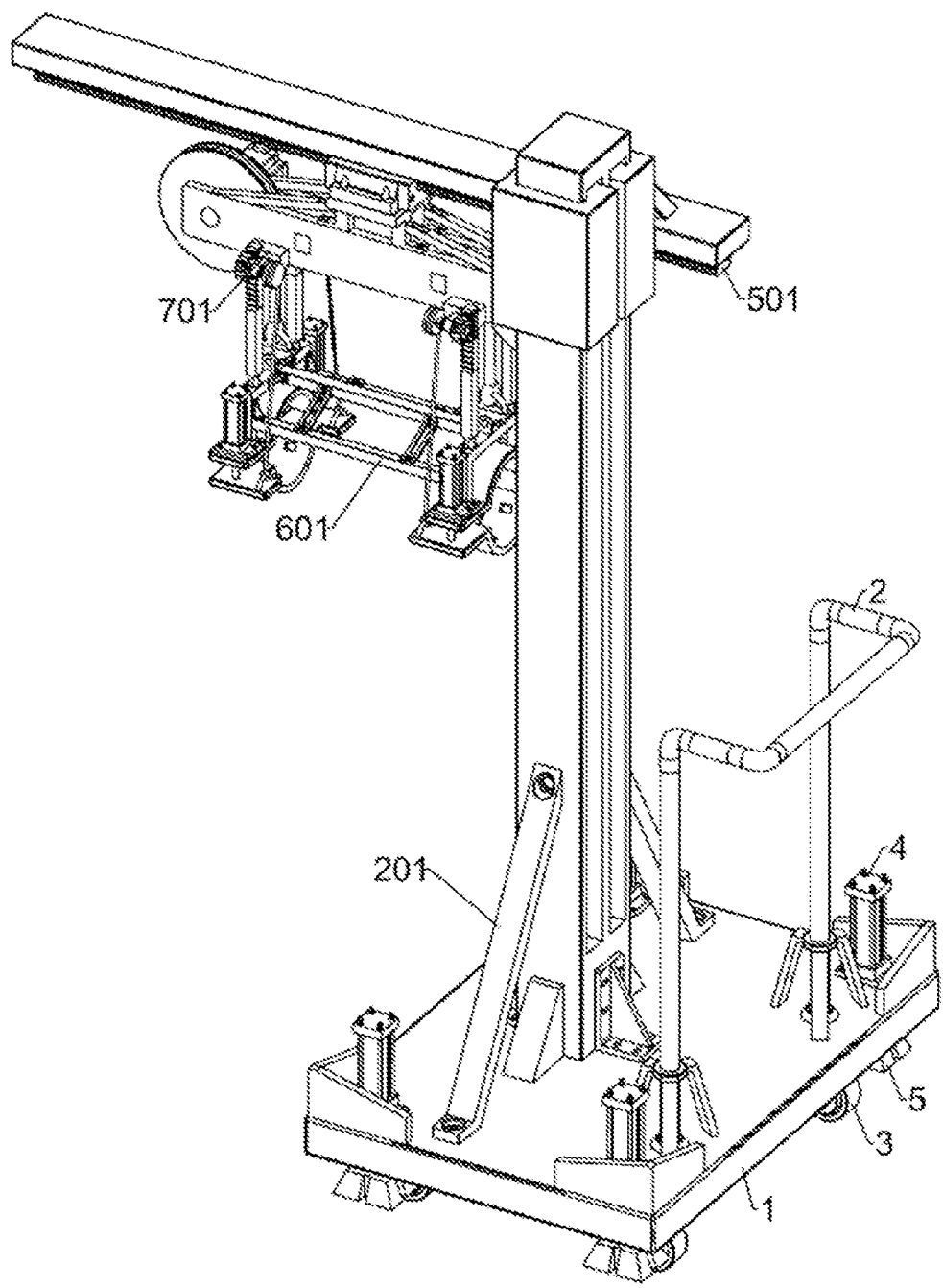
FIG. 3 is a partial structural diagram of construction equipment of soil nailing wall for geological disaster control of the disclosure.
Figure 4:
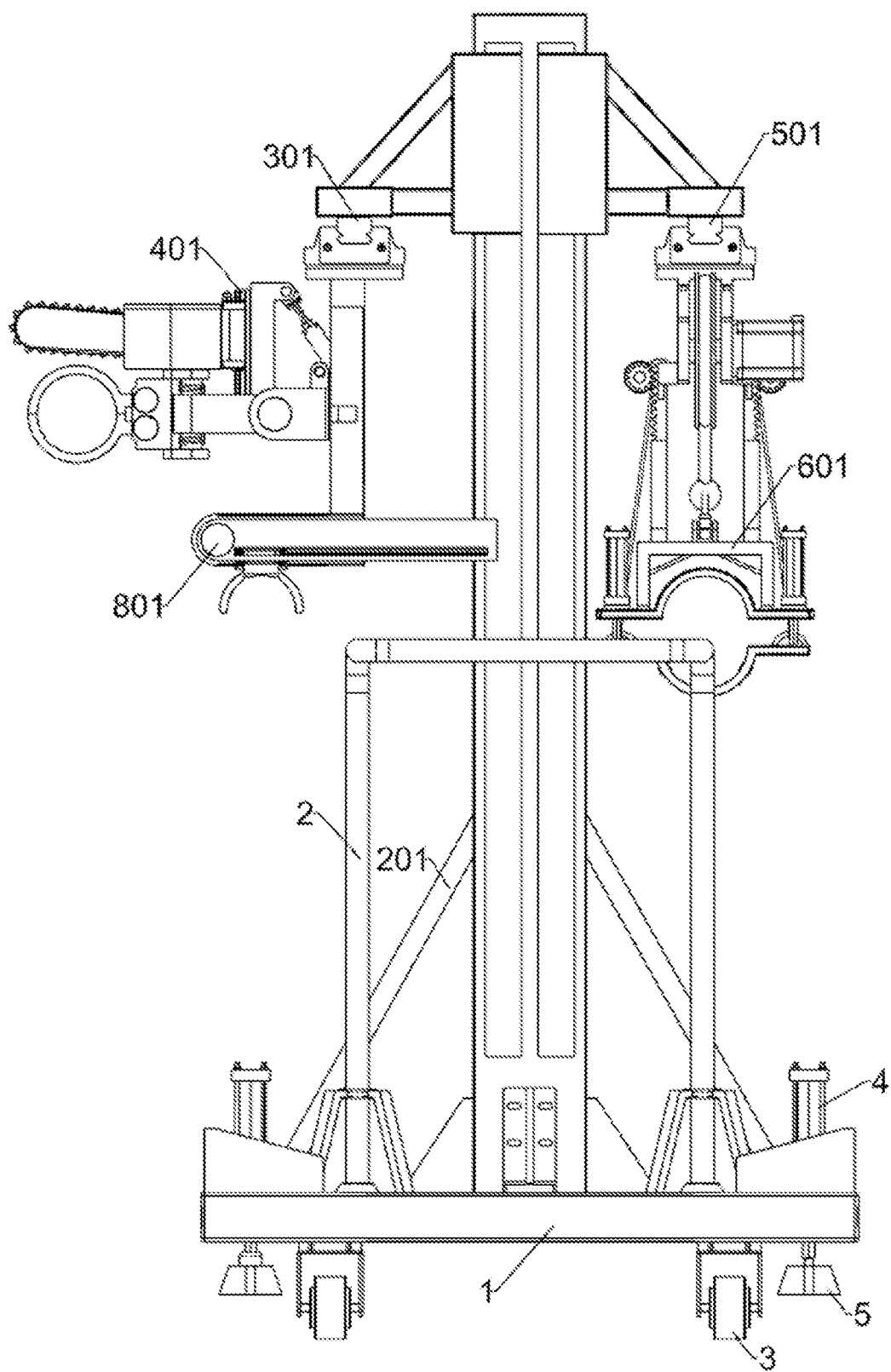
FIG. 4 is a right side view of the construction equipment of soil nailing wall for geological disaster control according to the disclosure.
Figure 5:
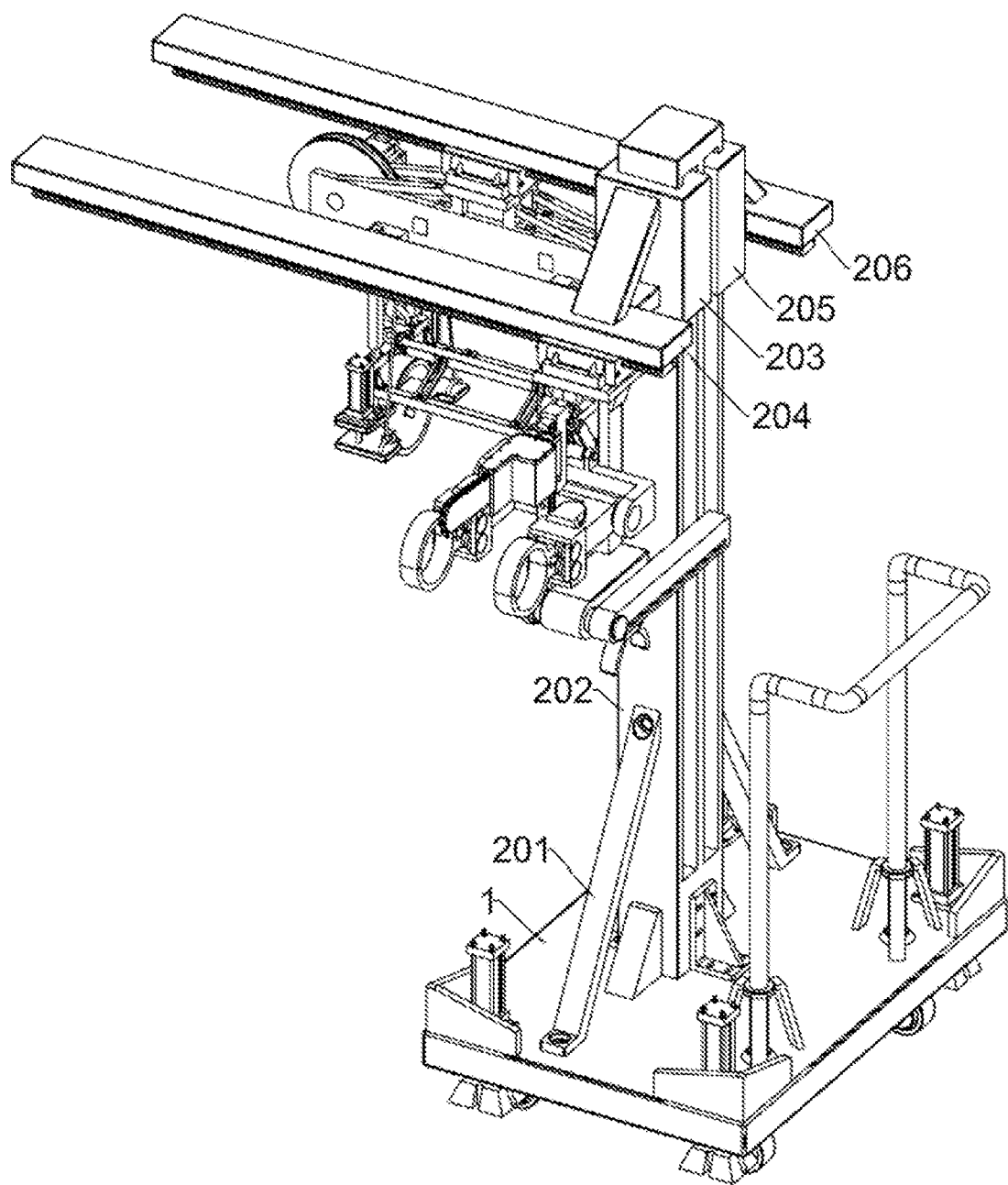
FIG. 5 is a structural diagram of the lifting assembly of the disclosure.
Figure 6:
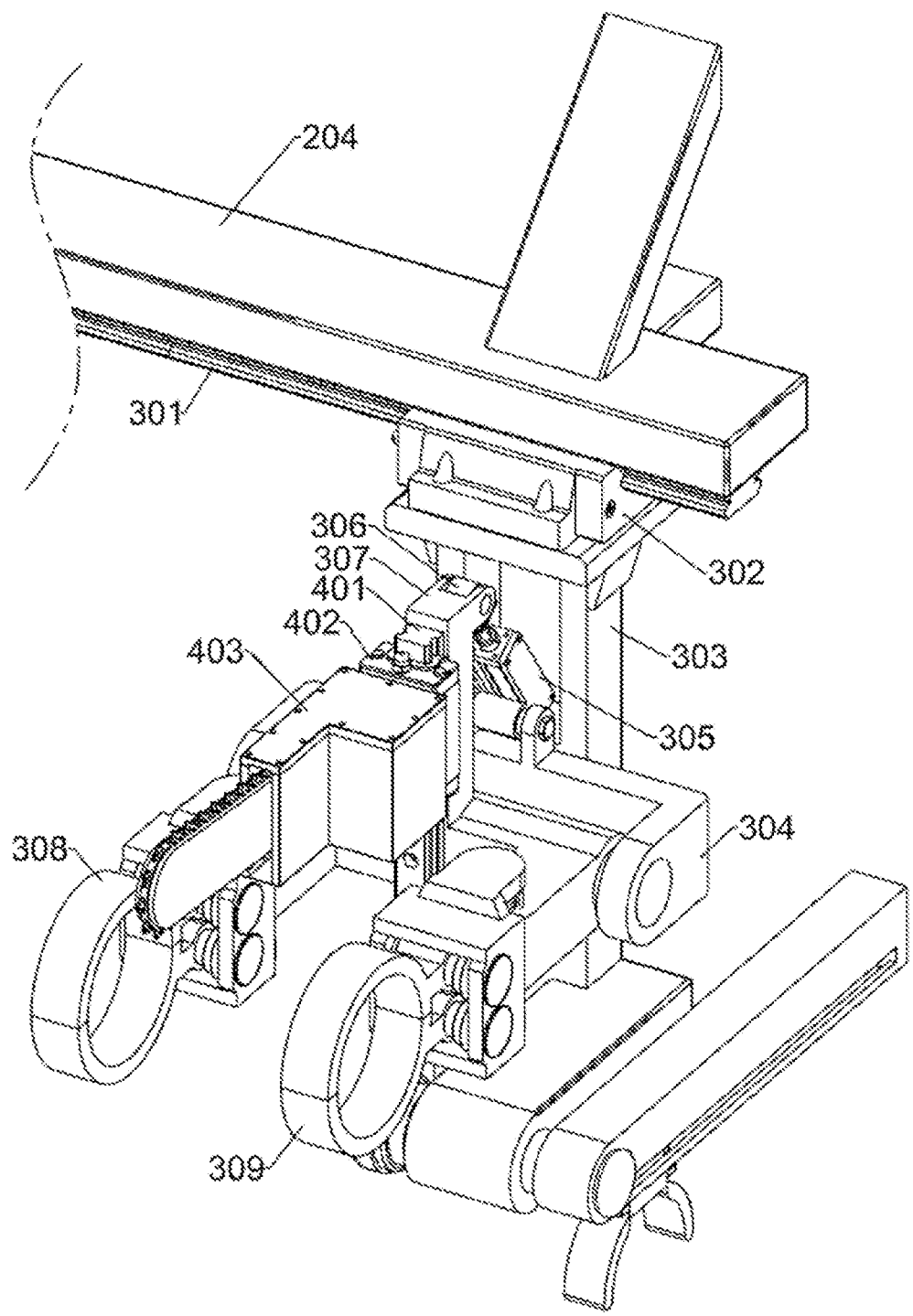
FIG. 6 is a structural diagram of the fixing assembly and the cutting assembly of the disclosure.
Figure 7:
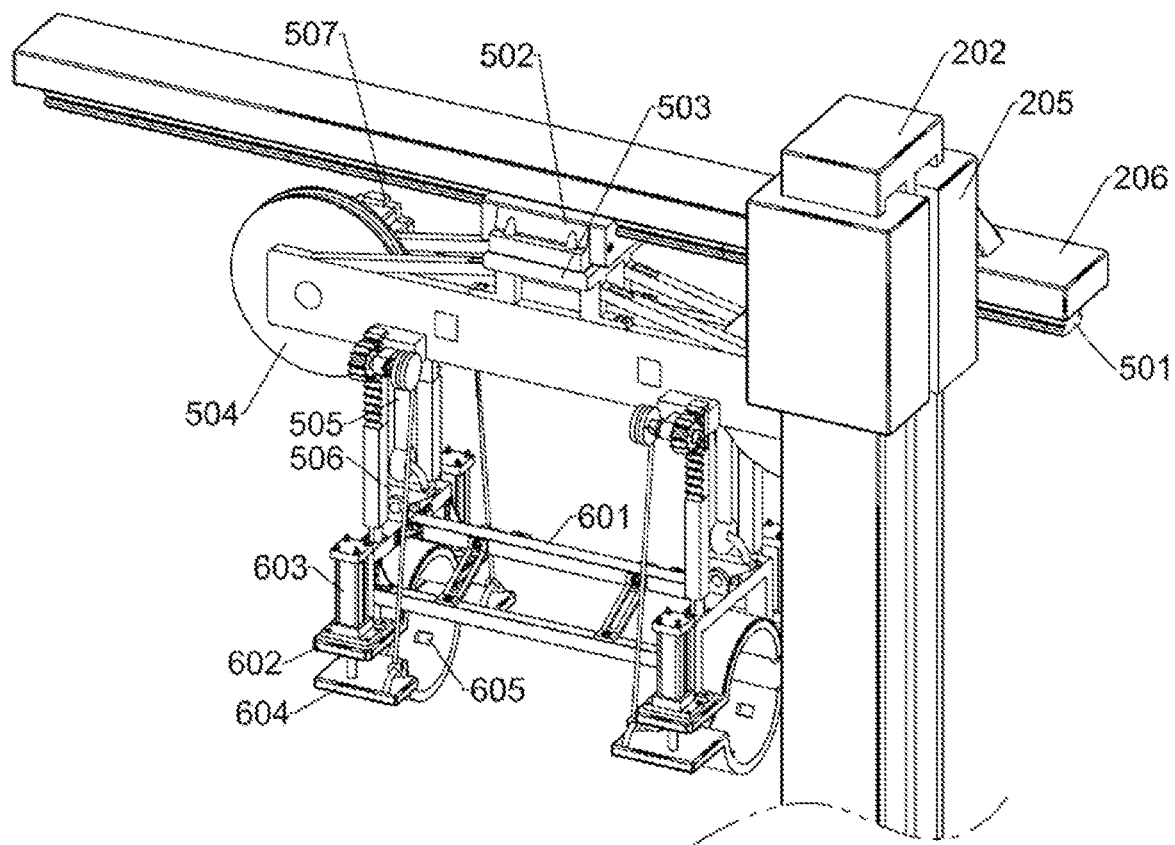
FIG. 7 is a structural diagram of the tilting assembly and the clamping assembly of the disclosure.
Figure 8:
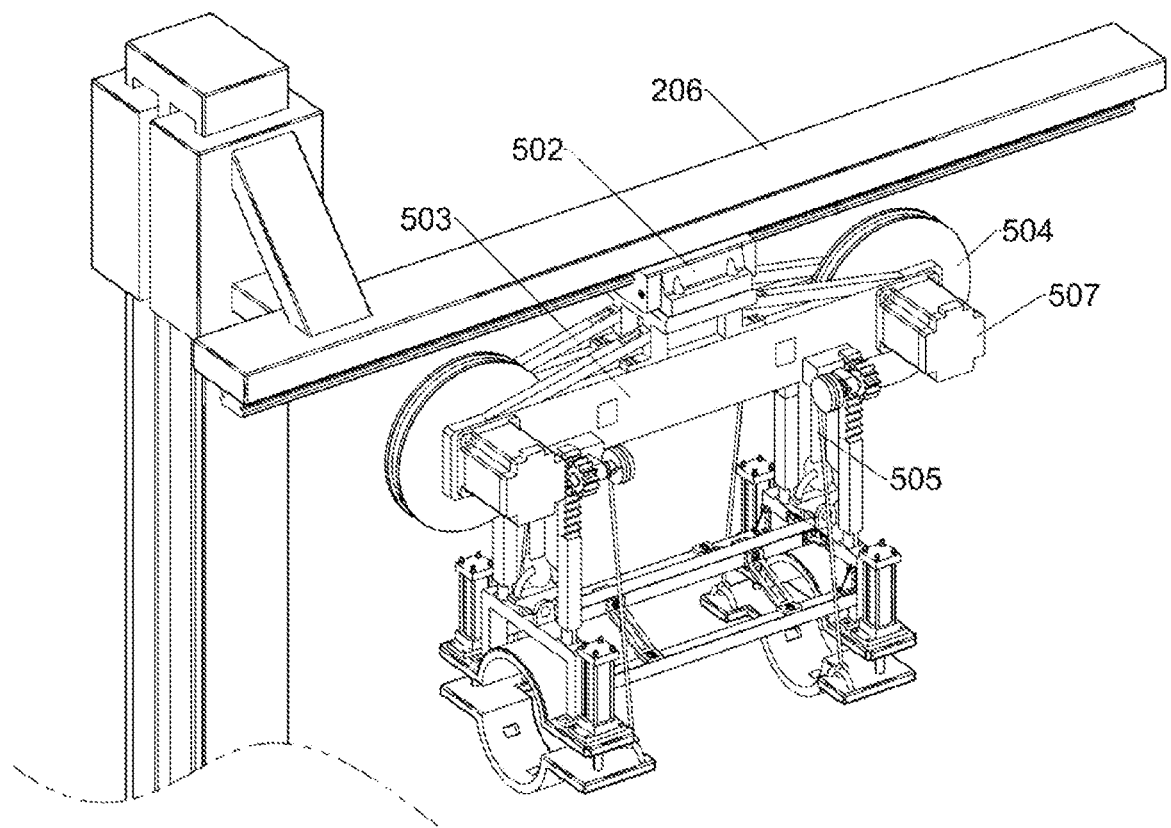
FIG. 8 is a structural diagram of the tilting assembly of the disclosure.
Figure 9:
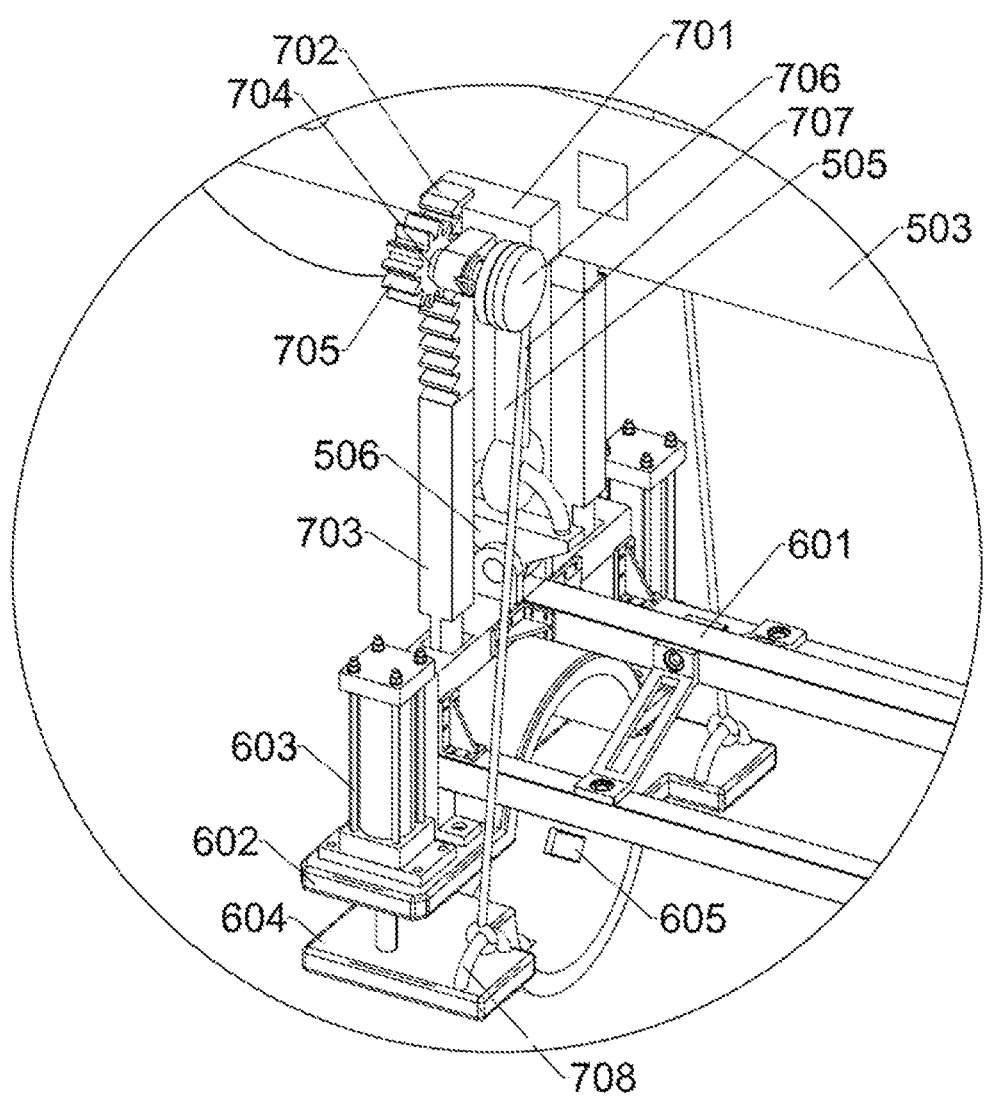
FIG. 9 is a structural diagram of the reinforcement assembly of the disclosure.
Figure 10:
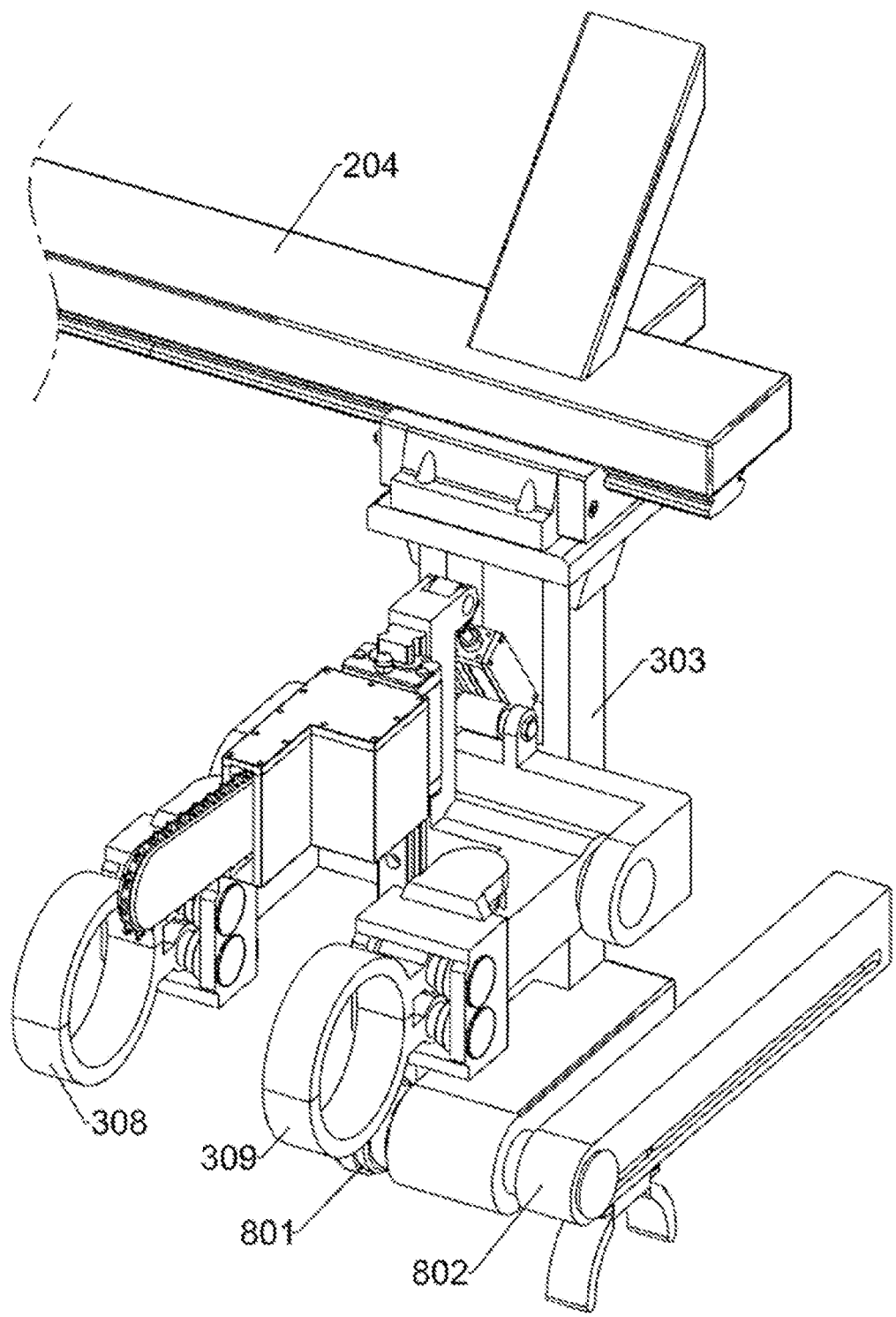
FIG. 10 is a structural diagram of an auxiliary assembly of the disclosure.
Figure 11:
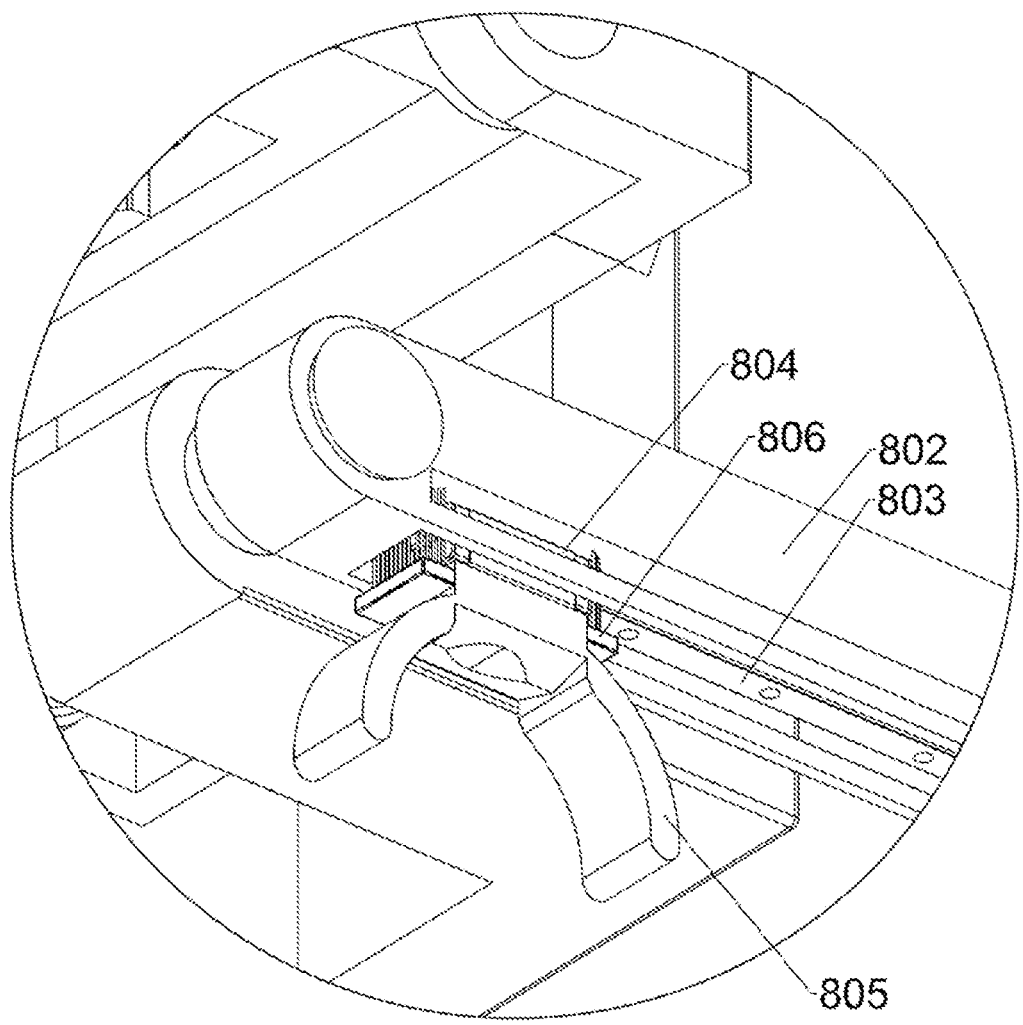
FIG. 11 is a partial structure diagram of the auxiliary assembly of the disclosure.

On the basis of the embodiment 1, as shown in FIG. 2 and FIGS. 10-11, the construction equipment further includes an auxiliary assembly. The lower part of the fixing assembly is installed with the auxiliary assembly, and the auxiliary assembly includes an electric rotation shaft 801, a third linkage block 802, a fifth guide rail 803, a sixth electric slider 804, a push frame 805, and a brush 806. The lower part of the front side of the third linkage frame 303 is equipped with the electric rotation shaft 801. The movable end of the electric rotation shaft 801 is fixedly connected with a third linkage block 802. The fifth guide rail 803 is fixedly connected to the lower side of the third linkage block 802. The fifth guide rail 803 is slidably connected with the sixth electric slider 804. The lower side of the sixth electric slider 804 is fixedly connected with the push frame 805. Two brushes 806 are fixedly connected at the front part and the rear part of the push frame 805 respectively, and the upper parts of the two brushes 806 are in contact with the fifth guide rail 803.

When the root of the tree trunk extending out of the slope breaks, the right part of the tree trunk fracture naturally sags. According to the tree trunk sagging position, the sixth electric slider 804 slides on the fifth guide rail 803, and the fifth guide rail 803 drives the push frame 805 to move. Then the electric shaft 801 drives the third linkage block 802 to rotate. From the right side view, the third linkage block 802 moves clockwise, so that the push frame 805 moves below the trunk sagging part, then lift up the sagging part of the tree trunk. After that, the third linkage block 802 drives the push frame 805 to move towards the direction of the third linkage frame 303, so that the push frame 805 conveys the sagging part of the tree trunk to the calipers of the second manipulator 309, and the second manipulator 309 clamps the sagging part of the tree trunk. At the same time, the push frame 805 drives the two brushes 806 to move, so that the two brushes 806 clean up the sediment falling on the fifth guide rail 803 to avoid jamming. When in use, the broken and sagging trunk can be automatically lifted up to the designated position, and the broken and bent trunk can be cut off with the cutting assembly, and the sediment falling onto the guide rail can be automatically cleaned up.

What is claimed is:

1. A construction process of soil nailing wall for geological disaster control, which uses a construction equipment, comprising an underframe (1), a handrail (2) and wheels (3), four first telescopic cylinders (4) and a support block (5); wherein a right part of an upper side of the underframe (1) is fixedly connected with the handrail (2); wherein four of the wheels (3) are fixedly connected to a lower side of the underframe (1); wherein the four first telescopic cylinders (4) are fixedly connected on an outer edge of the upper side of the underframe (1); wherein lower telescopic ends of the four first telescopic cylinders (4) are fixedly connected with the support block (5) respectively; wherein the construction equipment further comprises a lifting assembly, a fixing assembly, a cutting assembly, a tilting assembly, a clamping assembly and reinforcement assemblies; a left part of the upper side of the underframe (1) is provided with the lifting assembly; the fixing assembly is arranged at a front of an upper side of the lifting assembly; the cutting assembly is arranged at a middle of the fixing assembly; the tilting assembly is arranged at a rear of the upper side of the lifting assembly; a lower part of the tilting assembly is provided with the clamping assembly; two of the reinforcement assemblies are arranged at a left part and a right part of a front side of the tilting assembly; another two of the reinforcement assemblies are arranged at a left part and a right part of a rear side of the tilting assembly; and each of the reinforcement assemblies is connected with the clamping assembly;

the construction process of soil nailing wall for geological disaster control, comprising:

using the lifting assembly to drive the fixing assembly and the cutting assembly to a side of a tree trunk extending out of a soil slope;

using the fixing assembly to clamp the tree trunk at a clamping position at a root of the tree trunk and at a clamping position at an end of the tree trunk opposite the root;

cutting the tree trunk at a middle of the two clamping positions using the cutting assembly;

conveying the cut tree trunk to the ground using the fixing assembly;

manually placing a grouting rod in the clamping assembly, and fixing the grouting rod using the clamping assembly;

transferring the grouting rod to a side of a soil slope hole;

lifting an end of the grouting rod away from the soil slope hole to tilt the grouting rod upwardly;

placing the grouting rod into the soil slope hole;

wherein the lifting assembly comprises two support frames (201), a first guide rail (202), a first electric slider (203), a first linkage frame (204), a second electric slider (205) and a second linkage frame (206); the two support frames (201) are fixedly connected to a front part of the upper side and a rear part of the upper side of the underframe (1) respectively; the upper side of the underframe (1) is fixedly connected with the first guide rail (202), and the first guide rail (202) is located in a middle of a gap between the two support frames (201); the two support frames (201) are fixedly connected with the first guide rail (202); a front part of the first guide rail (202) is slidably connected with the first electric slider (203); a front side of the first electric slider (203) is fixedly connected with the first linkage frame (204); a rear part of the first guide rail (202) is slidably connected with the second electric slider (205); a rear side of the second electric slider (205) is fixedly connected with the second linkage frame (206); a lower side of the first linkage frame (204) is connected with the fixing assembly; and a lower side of the second linkage frame (206) is connected with the tilting assembly;

wherein the fixing assembly comprises a second guide rail (301), a third electric slider (302), a third linkage frame (303), a fourth linkage frame (304), a second telescopic cylinder (305), a first linkage block (306), a fifth linkage frame (307), a first manipulator (308) and a second manipulator (309); the lower side of the first linkage frame (204) is fixedly connected with the second guide rail (301); the second guide rail (301) is slidably connected with the third electric slider (302); a lower side of the third electric slider (302) is fixedly connected with the third linkage frame (303); a front side of the third linkage frame (303) is fixedly connected with the fourth linkage frame (304); a front side of the fourth linkage frame (304) is rotationally connected with the fifth linkage frame (307); a middle of an upper side of the fourth linkage frame (304) is rotationally connected with the second telescopic cylinder (305); a telescopic end of the second telescopic cylinder (305) is rotationally connected with the first linkage block (306); the first linkage block (306) is rotationally connected with the fifth linkage frame (307); the fifth linkage frame (307) is equipped with the first manipulator (308) on a left part of a front side through a torsion shaft; the fifth linkage frame (307) is equipped with the second manipulator (309) on a right part of a front side through the torsion shaft; and an upper part of the front side of the fifth linkage frame (307) is connected with the cutting assembly.

2. The construction process of soil nailing wall for geological disaster control according to claim 1, wherein the cutting assembly comprises a third guide rail (401), a fourth electric slider (402) and an electric saw (403); the upper part of the front side of the fifth linkage frame (307) is fixedly connected with the third guide rail (401); the third guide rail (401) is slidably connected with the fourth electric slider (402); and a front side of the fourth electric slider (402) is provided with the electric saw (403).

3. The construction process of soil nailing wall for geological disaster control according to claim 2, wherein the tilting assembly comprises a fourth guide rail (501), a fifth electric slider (502), a sixth linkage frame (503), two first reel wheels (504), two first ropes (505), two second linkage blocks (506) and two motors (507); the lower side of the second linkage frame (206) is fixedly connected with the fourth guide rail (501); the fourth guide rail (501) is slidably connected with the fifth electric slider (502); a lower side of the fifth electric slider (502) is fixedly connected with the sixth linkage frame (503); a left part and a right part of the sixth linkage frame (503) are rotationally connected with the two first reel wheels (504) respectively; the two motors (507) are respectively arranged on a left part and a right part of a rear side of the sixth linkage frame (503); output ends of the two motors (507) are respectively fixedly connected with the two first reel wheels (504); the two first ropes (505) are wound on the two first reel wheels (504); lower ends of the two first ropes (505) are suspended and connected with the two second linkage blocks (506) respectively; the two second linkage blocks (506) are connected with the clamping assembly respectively; and the sixth linkage frame (503) is connected with four groups of the reinforcement assemblies.

4. The construction process of soil nailing wall for geological disaster control according to claim 3, wherein the clamping assembly comprises a seventh linkage frame (601), two first clamps (602), two third telescopic cylinders (603), two second clamps (604) and a plurality of rollers (605); lower parts of the two second linkage blocks (506) are rotationally connected with the seventh linkage frame (601) respectively; a left part and a right part of the seventh linkage frame (601) are fixedly connected with the two first clamps (602) respectively; upper sides of the two first clamps (602) are fixedly connected with the two third telescopic cylinders (603) respectively; the two second clamps (604) are fixedly connected to lower telescopic ends, of the two third telescopic cylinders (603) respectively; inner sides of the two second clamps (604) are rotationally connected with the plurality of the rollers (605); one of the two second clamps located on a left side of the seventh linkage frame (601) is connected with two of the reinforcement assemblies located on the left side of the seventh linkage frame (601); and an other one of the two second clamps located on a right side of the seventh linkage frame (601) is connected with two of the reinforcement assemblies located on the right side of the seventh linkage frame (601).

5. The construction process of soil nailing wall for geological disaster control according to claim 4, wherein a middle of each of the two first clamps (602) is provided with an upper semicircular groove.

6. The construction process of soil nailing wall for geological disaster control according to claim 4, wherein a middle of each of the two second clamps (604) is provided with a lower semicircular groove, and a middle of the semicircular groove is provided with a plurality of smaller grooves.

7. The construction process of soil nailing wall for geological disaster control according to claim 4, wherein each of the two of the reinforcement assemblies located on the left side of the seventh linkage frame (601) comprises a limit block (701), a rack (702), a limit rod (703), a transmission rod (704), a straight gear (705), a second reel wheel (706), a second rope (707) and a linkage ring (708); a front part of a left side of the sixth linkage frame (503) is fixedly connected with the limit block (701); a left part of the limit block (701) is slidably connected with the rack (702); a lower part of the rack (702) is fixedly connected with the limit rod (703); a lower part of the limit rod (703) is inserted into the seventh linkage frame (601); a middle of the limit block (701) is rotationally connected with the transmission rod (704); a left part of the transmission rod (704) is fixedly connected with the straight gear (705); the straight gear (705) engages with the rack (702); a right part of the transmission rod (704) is fixedly connected with the second reel wheel (706); the second reel wheel (706) is connected with the straight gear (701) through a torsion spring; the second reel wheel (706) is wound with the second rope (707); a front side of the second clamp (604) on the left is fixedly connected with the linkage ring (708); and a lower end of the second rope (707) is movably connected with the linkage ring (708).

8. The construction process of soil nailing wall for geological disaster control according to claim 7, wherein the construction equipment further comprises an auxiliary assembly, a lower part of the fixing assembly is installed with the auxiliary assembly, and the auxiliary assembly comprises an electric rotation shaft (801), a third linkage block (802), a fifth guide rail (803), a sixth electric slider (804), a push frame (805), and two brushes (806); a lower part of the front side of the third linkage frame (303) is equipped with the electric rotation shaft (801); a movable end of the electric rotation shaft (801) is fixedly connected with third linkage block (802); the fifth guide rail (803) is fixedly connected to a lower side of the third linkage block (802); the fifth guide rail (803) is slidably connected with the sixth electric slider (804); a lower side of the sixth electric slider (804) is fixedly connected with the push frame (805); the two brushes (806) are fixedly connected at a front part and a rear part of the push frame (805) respectively; and upper parts of the two brushes (806) are in contact with the fifth guide rail (803).

\* \* \* \* \*